Patented Mar. 31, 1931

1,798,556

UNITED STATES PATENT OFFICE

ERNST PREISWERK, OF BASEL, SWITZERLAND, ASSIGNOR TO HOFFMANN-LA ROCHE INC., OF NUTLEY, NEW JERSEY, A CORPORATION OF NEW JERSEY

PROCESS FOR MAKING COMPOUNDS OF DIALKYL BARBITURIC ACIDS AND 1-PHENYL-2.3-DIMETHYL-4-DIMETHYLAMINO-5-PYRAZOLONE

No Drawing. Application filed July 10, 1925, Serial No. 42,826, and in Switzerland July 23, 1924.

My invention relates to a new process of making compounds of dialkyl barbituric acids and 1-phenyl-2,3-dimethyl-4-dimethylamino-5 pyrazolone. These compounds have the general formula:

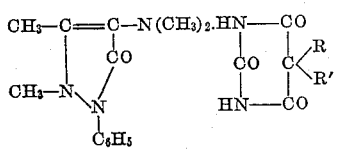

R and R' being the same or two different alkyl groups.

I have found that compounds of 1 molecule of dialkyl barbituric acid and 1 molecule of 1-phenyl-2,3-dimethyl-4-dimethylamino-5-pyrazolone may be formed when these two constituent materials are dissolved in a suitable solvent. From a sufficiently concentrated solution the compounds crystallize in needles. According to the solvent used the constituent materials are used in molecular proportion or a more or less great excess of the one or the other of the same is required. There is always obtained however the compound of 1 molecule of dialkyl-barbituric acid with one molecule of 1-phenyl-2,3-dimethyl-4-dimethylamino-5-pyrazolone.

Example 1

250 parts of 1-phenyl-2,3-dimethyl-4-dimethylamino-5-pyrazolone and 184 parts of diethyl barbituric acid are boiled in 250 parts of acetone with reflux until a perfectly clear yellow solution is produced. This solution is cooled and if necessary seeded. It solidifies to a cake of fine crystal needles. The mother liquor is removed therefrom by expressing it and can be utilized for the preparation of a further quantity of the compound. The compound obtained forms a yellowish crystal powder which has a weakly acid reaction and melts at 115° C. It is soluble in the usual solvents.

Example 2

335 parts of 1-phenyl-2,3-dimethyl-4-dimethylamino-5-pyrazolone and 210 parts of isopropyl allyl barbituric acid are dissolved in 370 parts of benzol with reflux. A clear yellow colored solution is produced, from which after cooling the compound separates in slightly yellow colored needle-shaped crystals. The crystal paste is expressed from the mother liquor and dried. The yellow colored compound is easily dissolved in organic solvents.

Example 3

231 parts of 1-phenyl-2,3-dimethyl-4-dimethylamino-5-pyrazolone and 210 parts of isopropyl allyl barbituric acid are dissolved in 180 parts of a mixture of equal parts of acetone and alcohol 92%. The solution is boiled until it clears; when it cools, the new compound separates in the form of crystals; from the mother liquor. The compounds of 1 molecule of 1-phenyl-2,3-dimethyl-4-dimethylamino-5-pyrazolone and 1 molecule of isopropyl allylbarbituric acid thus obtained forms yellow prisms melting at 95° C.

When I speak in my claims of a common solvent I refer to a liquid medium in which both constituents will dissolve and which will permit precipitation of the specified compound by crystallization.

I claim:

1. The process which consists in dissolving a dialkyl barbituric acid and 1-phenyl-2.3-dimethyl-4-dimethylamino-5-pyrazolone in molecular proportions in a common solvent and permitting the resulting pure compound of these two constituents, present in molecular proportion, to separate by precipitation in the form of crystals and separating said crystals from the solvent before any excess of one of the constituents may crystallize out.

2. The process which consists in dissolving iso propyl allyl barbituric acid and 1-phenyl-2.3-dimethyl-4-dimethylamino-5-pyrazolone in molecular proportions in a common solvent and permitting the resulting pure compound of these two constitutents, present in molecular proportion, to separate by precipitation in the form of crystals and separating said crystals from the solvent before any excess of one of the constituents may crystallize out.

In witness whereof I have hereunto set my hand.

Dr. ERNST PREISWERK.